United States Patent [19]

Mori et al.

[11] Patent Number: 5,516,834
[45] Date of Patent: May 14, 1996

[54] AQUEOUS COATING COMPOSITION

[75] Inventors: Yoshio Mori, Ichinomiya; Shiro Kojima, Tokai, both of Japan

[73] Assignee: Toagosei Chemical Industry Co., Ltd., Tokyo, Japan

[21] Appl. No.: 495,392

[22] Filed: Jun. 28, 1995

Related U.S. Application Data

[62] Division of Ser. No. 202,564, Feb. 28, 1994, Pat. No. 5,455,306.

[30] Foreign Application Priority Data

| Mar. 4, 1993 | [JP] | Japan | 5-069324 |
| Mar. 8, 1993 | [JP] | Japan | 5-072939 |
| Nov. 2, 1993 | [JP] | Japan | 5-297386 |

[51] Int. Cl.$^6$ .................................................. C08F 265/04
[52] U.S. Cl. ........................ 524/504; 525/295; 525/301; 525/303; 525/305
[58] Field of Search ................ 524/504; 525/295, 525/301, 303, 305

[56] References Cited

U.S. PATENT DOCUMENTS

| 5,096,954 | 3/1992 | Yamada et al. . | |
| 5,310,813 | 5/1994 | Nagasawa et al. | 525/309 |

FOREIGN PATENT DOCUMENTS

| 0526991 | 7/1992 | European Pat. Off. . |
| 372577 | 3/1991 | Japan . |
| 5202320 | 8/1993 | Japan . |
| 1126855 | 9/1968 | United Kingdom . |
| 1227008 | 3/1971 | United Kingdom . |

OTHER PUBLICATIONS

JP 6065535—Abstract Mar. 8, 1994 Japan Toagosei Chem.

*Primary Examiner*—Jeffrey T. Smith
*Attorney, Agent, or Firm*—Browdy and Neimark

[57] ABSTRACT

An aqueous coating composition constitutes an aqueous graft copolymer and an amino resin, the graft copolymer being obtained by neutralizing, with a base, the carboxyl groups of a copolymer which is obtained by copolymerizing the following components (a), (b), (c) and (d) and which contains 3–30% of component (a), 3–20% of component (b), 5–40% of component (c) and 10–89% of component (d):

(a) a radical-polymerizable polyester compound having a (meth)acryloyl group at one end, preferably a macromolecular monomer which is a copolymer of a hydroxyalkyl (meth)acrylate and another α,β-ethylenically unsaturated monomer, having a radical-polymerizable group at one end, (b) an α,β-ethylenically unsaturated carboxylic acid, (c) a hydroxyalkyl (meth)acrylate, and (d) another vinyl monomer.

14 Claims, No Drawings

AQUEOUS COATING COMPOSITION

This is a division of parent application Ser. No. 08/202,564 filed Feb. 28, 1994, now U.S. Pat. No. 5,455,306.

FIELD OF INVENTION

The present invention relates to an aqueous coating composition suitable for coating of metals. The aqueous coating composition of the present invention can form a coating film having excellent resistances particularly to water at high temperatures and steam heating and is therefore suitable for use as a coating particularly for the outer surfaces of metal cans used for packaging of refreshing beverages, processed foods, etc.

BACKGROUND

Coatings for metal cans used for packaging of refreshing beverages, processed foods, etc. must have water resistance at high temperatures. As such coatings, there have heretofore been used organic solvent type coatings capable of forming a coating film exhibiting excellent properties when heat-cured, and examples thereof include epoxy/amino resins, acrylic/amino resins and polyester/amino resins.

With the organic solvent type coatings, however, a large amount of an organic solvent vaporizes into the air when they are applied, which has invited environmental pollution and a waste of resources.

Hence, aqueous coatings using water as a medium have been investigated recently. Conventional aqueous coatings, however, have low water resistance. That is, their coating films show significant reduction in hardness and impact strength when subjected to a treatment with pressurized steam of 120° C. or higher (a retort treatment) and are unusable in practical applications, although said coating films are resistant to a treatment with hot water (e.g. boiling water).

In order to develop an aqueous coating resistant to the retort treatment, Japanese Patent Application Kokai (Laid-Open) No. 72577/1991 and U.S. Pat. No. 5,096,954 propose an aqueous coating composition comprising (a) an aqueous acrylic resin obtained by neutralizing, with a base, a copolymer which is composed mainly of an aromatic vinyl monomer and an alkyl (meth)acrylate and which contains carboxyl groups and hydroxyl groups in the molecule, (b) an amino resin and (c) a polyol which is a polyester, a polyether, a polyurethane or a polybutadiene each having hydroxyl groups at the ends.

Further, EP 0526991A1 proposes an aqueous coating composition comprising the above resin (a), the above resin (b) and (d) a reaction product of an amino compound and an epoxy resin.

Each of the above aqueous coating compositions employs a means for increasing the crosslinking density of the aqueous acrylic resin in order to obtain a cured coating film of high water resistance and uses the resin (c) or (d) in order to obtain a tough coating film.

SUMMARY OF INVENTION

The first object of the present invention is to provide an aqueous coating composition capable of forming a cured film resistant to a hot water treatment and/or a hot steam treatment. The second object of the present invention is to provide a process for coating a metal substrate with said aqueous coating composition. The third object of the present invention is to provide a metal can for packaging of refreshing beverages or processed foods, whose outer surface is coated with said aqueous coating composition.

In order to achieve the above objects, the present inventors developed an aqueous coating composition comprising an aqueous graft copolymer having a particular constitution and an amino resin.

DETAILED DESCRIPTION OF EMBODIMENTS

The first aspect of the present invention lies in an aqueous coating composition comprising an aqueous graft copolymer and an amino resin, said aqueous graft copolymer being obtained by neutralizing, with a base, the carboxyl groups of a copolymer which is obtained by copolymerizing the following components (a), (b), (c) and (d) and which comprises a unit derived from the component (a), a unit derived from the component (b), a unit derived from the component (c) and a unit derived from the component (d) in amounts of 3–30% by weight, 3–20% by weight, 5–40% by weight and 10–89% by weight, respectively, all based on the total of said units derived from the components (a) to (d):

(a) a radical-polymerizable compound selected from the group consisting of the following compounds (i), (ii) and (iii):
  (i) a macromolecular monomer which is a (meth)-acrylonitrile/styrene copolymer having a radical-polymerizable group at one end,
  (ii) a macromolecular monomer which is a copolymer of a hydroxyalkyl (meth)acrylate and another $\alpha,\beta$-ethylenically unsaturated monomer, having a radical-polymerizable group at one end, and
  (iii) a radical-polymerizable polyester which is a polyester of lower condensation degree having a (meth)acryloyl group at one end,
(b) an $\alpha,\beta$-ethylenically unsaturated carboxylic acid,
(c) a hydroxyalkyl (meth)acrylate, and
(d) another vinyl monomer.

The second aspect of the present invention lies in a process for coating a metal substrate with the aqueous coating composition of the first aspect.

The third aspect of the present invention lies in a metal can whose outer surface is coated with said aqueous coating composition.

In the present invention, the radical-polymerizable compound (i) usable as the component (a) constituting the aqueous graft copolymer is a macromolecular monomer which is a (meth)acrylonitrile/styrene copolymer having a radical-polymerizable group at one end.

The radical-polymerizable group is preferably (meth)acryloyl group. The macromolecular monomer has preferably a molecular weight of 2,000–30,000 in terms of number-average molecular weight. Incidentally, in the present invention, the number-average molecular weight is a polystyrene-reduced number-average molecular weight measured by gel permeation chromatography.

The (meth)acrylonitrile/styrene copolymer as the skeleton of the macromolecular monomer is preferably a (meth)acrylonitrile/styrene binary copolymer. However, the skeleton copolymer may be a (meth)acrylonitrile/styrene type copolymer comprising, in addition to the (meth)acrylonitrile and styrene monomer units, another monomer unit in an amount of 20% by weight or less based on the total constitutional monomer units of the copolymer.

When the skeleton of the macromolecular monomer is a (meth)acrylonitrile/styrene binary copolymer, the preferable proportions of (meth)acrylonitrile and styrene in the binary copolymer are (meth)acrylonitrile/styrene =5–50% by weight/95–50% by weight.

The radical-polymerizable monomer usable, other than (meth)acrylonitrile and styrene includes, for example, styrene derivatives such as α-methylstyrene, p-methylstyrene and the like, and (meth)acrylic acid esters such as methyl (meth)acrylate, ethyl (meth)acrylate, butyl (meth)acrylate, 2-ethylhexyl (meth)acrylate, cyclohexyl (meth)acrylate and the like.

In the present invention, the radical-polymerizable compound (ii) usable as the component (a) is a macromolecular monomer which is a copolymer of a hydroxyalkyl (meth)acrylate and another α,β-ethylenically unsaturated monomer, having a radical-polymerizable group at one end.

The radical polymerizable group is preferably (meth)acryloyl group. The macromolecular monomer has a molecular weight of preferably 2,000–30,000 in terms of number-average molecular weight.

In the copolymer as the skeleton of the macromolecular monomer, the proportion of the hydroxyalkyl (meth)acrylate monomer unit is preferably 5–40% by weight, more preferably 15–35% by weight based on the total constitutional monomer units of said copolymer.

When the proportion of the hydroxyalkyl (meth)acrylate monomer unit is less than 5% by weight, the resulting aqueous coating composition has low water resistance and, when the proportion is more than 40% by weight, the aqueous coating composition gives a coating film of low processability.

The hydroxyalkyl (meth)acrylate includes hydroxyethyl (meth)acrylate, 2-hydroxypropyl (meth)acrylate, 3-hydroxypropyl (meth)acrylate, hydroxybutyl (meth)acrylate, etc.

The other α,β-ethylenically unsaturated monomer constituting the copolymer as the skeleton of the macromolecular monomer together with the hydroxyalkyl (meth)acrylate, includes, for example, (meth)acrylic acid esters such as methyl (meth)acrylate, ethyl (meth)acrylate, butyl (meth)acrylate, 2-ethylhexyl (meth)acrylate, cyclohexyl (meth)acrylate and the like; styrene derivatives such as styrene, α-methylstyrene, p-methylstyrene and the like; nitrile group-containing vinyl monomers such as (meth)acrylonitrile and the like; and alkylamino esters of (meth)acrylic acid.

The other α,β-ethylenically unsaturated monomer is preferably an alkyl (meth)acrylate having an alkyl moiety of 4–8 carbon atoms, in view of the water resistance and weatherability of the coating film formed with the resulting aqueous coating composition. The preferable amount of said alkyl (meth)acrylate monomer unit in the copolymer as the skeleton of the macromolecular monomer is 50–95% by weight based on the total constitutional monomer units of said copolymer.

In the present invention, the radical-polymerizable compound (iii) usable as the component (a) is a radical-polymerizable polyester which is a polyester of low condensation degree having a (meth)acryloyl group at one end. Preferable examples thereof are compounds represented by the following chemical formulas (1) and (2), and the compound represented by chemical formula (1) is more preferable:

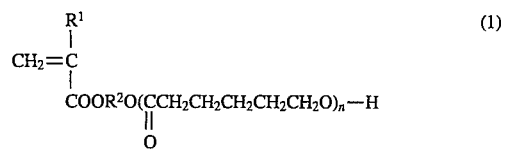

wherein $R^1$ is hydrogen atom or methyl group, $R^2$ is an alkylene group of 2–4 carbon atoms, and n is 2–10, and

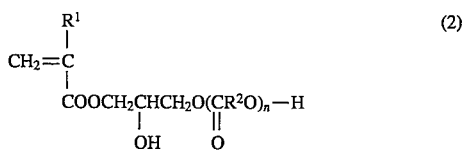

wherein $R^1$ is hydrogen atom or methyl group, $R^2$ is an alkylene group of 17 carbon atoms, and n is 2–10.

The radical-polymerizable polyester has a number-average molecular weight of preferably 400–4,000. When the number-average molecular weight is smaller than 400, the resulting aqueous coating composition gives a coating film which easily reduces its impact strength after a retort treatment. When the molecular weight is larger than 4,000, the aqueous coating composition hardly gives a coating film of high hardness.

The compound represented by chemical formula (1) can be synthesized by subjecting ε-caprolactone to ring-opening polycondensation in the presence of hydroxyethyl (meth)acrylate using a catalyst such as stannous chloride or the like [e.g. Japanese Patent Application Kokai (Laid-Open) No. 195714/1982]. As the compound represented by chemical formula (1), there may be used commercial products such as Placcel FM series (caprolactone-modified methacrylic acid esters), i.e., FM-1, FM-2, FM-3, FM-4, FM-5, etc. and Placcel FA series (caprolactone-modified acrylic acid esters), i.e., FA-1, FA-2, FA-3, FA-4, FA-5, etc, all of which are products of DAICEL CHEMICAL INDUSTRIES, LTD.

The compound represented by chemical formula (2) can be synthesized by polycondensing 12-hydroxystearic acid in the presence of an acid catalyst, to obtain a polyester of low condensation degree having a hydroxyl group and a carboxyl group at the molecular ends and then reacting the polyester with glycidyl (meth)acrylate.

The aqueous graft copolymer of the present invention can be obtained by copolymerizing the radical-polymerizable compound (a) selected from the group consisting of the above-mentioned compounds (i) to (iii), with the components (b) to (d) described below in detail, to obtain a carboxyl-containing copolymer (hereinafter referred to simply as copolymer) and then neutralizing the copolymer with a base. In the copolymer, the proportion of the unit derived from the component (a) is, as mentioned previously, 3–30% by weight, preferably 5–20% by weight based on the total monomer units of the copolymer.

When the proportion of the unit derived from the component (a) in the copolymer is less than 3% by weight, the aqueous graft copolymer obtained by neutralizing the copolymer has a low impact strength and, when the proportion is more than 30% by weight, the aqueous graft copolymer has a low hardness.

Next, the α,β-ethylenically unsaturated carboxylic acid, which is the component (b), includes acrylic acid, methacrylic acid, crotonic acid, maleic acid, maleic anhydride, fumaric acid, itaconic acid, etc. Among them, acrylic acid and methacrylic acid are preferred.

When the proportion of the unit derived from the component (b) in the copolymer is less than 3% by weight, the copolymer is insufficiently water-soluble or water-dispersible. When the proportion is more than 20% by weight, the resulting aqueous coating composition gives a coating film of low water resistance.

The hydroxyalkyl (meth)acrylate, which is the component (c), includes hydroxyethyl (meth)acrylate, 2-hydroxypropyl (meth)acrylate, 3-hydroxypropyl (meth)acrylate, hydroxybutyl (meth)acrylate, etc.

When the proportion of the unit derived from the component (c) in the copolymer is less than 5% by weight, the resulting aqueous coating composition gives a coating film of low water resistance. When the proportion is more than 40% by weight, the aqueous coating composition gives a coating film of low impact resistance. The preferable proportion of the unit derived from the component (c) is 5–30% by weight.

The other vinyl monomer [the component (d)] constituting the copolymer of the present invention together with the components (a) to (c) includes, for example, (meth)acrylic acid esters such as methyl (meth)acrylate, ethyl (meth)acrylate, butyl (meth)acrylate, 2-ethylhexyl (meth)acrylate, cyclohexyl (meth)acrylate and the like; styrene derivatives such as styrene, α-methylstyrene, p-methylstyrene and the like; (meth)acrylonitrile; (meth)acrylamide; N-methoxymethyl-(meth)acrylamide; N-butoxymethyl(meth)acrylamide; and alkylamino esters of (meth)acrylic acid. These monomers can be used singly or in combination of two or more.

Among the other vinyl monomers mentioned above, monomers having a hydroxyl group—reactive functional group, such as N-methoxymethyl(meth)acrylamide, N-(n-butoxy)methyl(meth)acrylamide and the like are preferred, because the resulting aqueous coating composition can give a coating film of higher crosslinking density. The unit of such a monomer having the functional group in the copolymer is preferably not more than 30% by weight.

The proportion of the unit derived from the component (d) in the copolymer is a value obtained by deducting the proportion of the units derived from the components (a) to (c), from the total monomer units (i.e. 100% by weight) of the copolymer and is 10–89% by weight, preferably 40–70% by weight, more preferably 60– 70% by weight.

The copolymer composed of the units derived from the components (a) to (d) has a hydroxyl value of preferably 20–150 KOH mg/g, more preferably 30–100 KOH mg/g. When the copolymer has a hydroxyl value of less than 20 KOH mg/g, the resulting aqueous coating composition has inferior processability. When the copolymer has a hydroxyl value of more than 150 KOH mg/g, the aqueous coating composition gives a coating film of low water resistance.

Since each of the component monomers (a) to (d) can be polymerized at a conversion of substantially 100% by a known radical polymerization process, the monomers (a) to (d) are fed in proportions corresponding to those of the monomer units in the resulting copolymer and copolymerized, whereby a copolymer having the above constitution can be obtained.

The outline of the preferable process for production of the copolymer composed of the monomers (a) to (d) is as follows.

That is, the monomers (a) to (d) are radical-polymerized at 60°–150° C. in the presence of a radical polymerization initiator such as 2,2'-azobisisobutyronitrile or the like, using a polymerization solvent such as isopropyl alcohol, n-butanol, isobutyl alcohol, ethylene glycol monomethyl ether, ethylene glycol monoethyl ether or the like.

In the above polymerization, use of an appropriate amount of a chain transfer agent such as n-dodecylmercaptan, mercaptoacetic acid, thiomalic acid, mercaptoethanol, mercaptopropionic acid or the like can allow the resulting copolymer to have a controlled molecular weight.

In the present invention, the molecular weight of the copolymer is preferably 2,000–20,000, more preferably 3,000–15,000 in terms of number-average molecular weight.

Thereafter, part or all of the carboxyl groups of the copolymer are neutralized with a base. Preferably, all the carboxyl groups are neutralized. By the neutralization, the copolymer is converted into a water-soluble or water-dispersible copolymer.

The neutralization can be conducted by a simple procedure of adding an aqueous base solution to an organic solvent solution of the copolymer, obtained by the above-mentioned polymerization.

As the base, there can be used, for example, organic amines such as monoethanolamine, dimethylamine, diethylamine, triethylamine, triethanolamine, diethylethanolamine, dimethylethanolamine and the like, as well as ammonia.

When the aqueous coating composition of the present invention is used as a coating for metal cans, dimethylethanolamine is preferred as the base. When the aqueous coating composition is used as a coating for metal substrates other than metal cans, triethylamine is preferred as the base.

The aqueous graft copolymer solution obtained by the above procedure is then subjected to distillation under reduced pressure to remove the organic solvent used as a polymerization solvent. The resulting material is mixed with water to obtain an aqueous solution or dispersion of the graft copolymer, having a solid content of 20–70% by weight, which is suitable for coating of a metal substrate.

In the present invention, the amino resin used in combination with the above-obtained aqueous graft copolymer includes, for example, alkyl-etherified melamine resins such as methyl-etherified melamine resin, butyl-etherified melamine resin and the like; alkyl-etherified urea resins; and alkyl-etherified benzoguanamine resins such as methyl-etherified benzoguanamine resin, ethyl-etherified benzoguanamine resin and the like. These amino resins can be used singly or in combination of two or more.

Among them, alkyl-etherified benzoguanamine resins such as methyl-etherified benzoguanamine resin, ethyl-etherified benzoguanamine resin and the like are preferred.

With respect to the degree of alkyl etherification of the amino resin, there can be used any of those amino resins wherein part or all of the active hydrogen atoms of amino group have been replaced by alkyl ether group(s).

The preferable amount of the amino resin used is 10–80 parts by weight per 100 parts by weight of the solid content of the aqueous graft copolymer.

The aqueous coating composition of the present invention may comprise various additives for coatings, in addition to the aqueous graft copolymer and the amino resin. Some examples of the additives are a film-forming assistant (e.g., ethylene glycol monobutyl ether) and a levelling agent.

With the aqueous coating composition of the present invention, it is possible to form, on a metal substrate, a cured coating film superior in hardness, water resistance, adhesivity and gloss. The present aqueous coating composition is suitable as a coating particularly for the outer surface of a metal can used for packaging of refreshing beverages or processed foods.

The aqueous solution or dispersion of the aqueous graft copolymer is mixed with the amino resin in the above-mentioned proportions; the mixture is coated on a metal substrate such as aluminum, stainless steel, zinc-treated steel plate, any other treated steel plate, tin plate or the like, followed by curing at 150°–220° C. for about 1–20 minutes; thereby, a cured coating film can be formed.

The aqueous coating composition of the present invention can be coated directly on a metal, or may be coated on an ink or a primer.

The present invention is hereinafter described more specifically with reference to Examples and Comparative Examples.

The details of the macromolecular monomers, etc. used in Examples and Comparative Examples are as follows.

Macromolecular monomer AN-6

A macromolecular monomer of poly(acrylonitrile/styrene) type produced by TOAGOSEI CHEMICAL INDUSTRY CO., LTD., having a methacryloyl group as a polymerizable group, a number-average molecular weight of 6,000 and proportions of acrylonitrile monomer unit/styrene monomer unit =25% by weight/75% by weight.

Macromolecular monomer AA-6

A macromolecular monomer of polymethyl methacrylate type produced by TOAGOSEI CHEMICAL INDUSTRY CO., LTD., having a methacryloyl group as a polymerizable group and a number-average molecular weight of 6,000.

Placcel FM-5

A radical-polymerizable polyester produced by DAICEL CHEMICAL INDUSTRIES, LTD., a monomer having a number-average molecular weight of 700 which is a caprolactone oligomer having a methacryloyl group at one end.

Placcel FM-3

A radical-polymerizable polyester produced by DAICEL CHEMICAL INDUSTRIES, LTD., a monomer having a number-average molecular weight of 470 which is a caprolactone oligomer having a methacryloyl group at one end.

Placcel FM-8

A radical-polymerizable polyester produced by DAICEL CHEMICAL INDUSTRIES, LTD., a monomer having a number-average molecular weight of 1,040 which is a caprolactone oligomer having a methacryloyl group at one end.

REFERENTIAL EXAMPLE 1

(Synthesis of macromolecular monomer M-1)

4.9 g of cyclohexyl methacrylate, 55.0 g of 2-ethylhexyl methacrylate and 25.1 g of 2-hydroxyethyl methacrylate were mixed. One third of the resulting mixture, 10.5 g of styrene, 0.9 g of mercaptopropionic acid as a chain transfer agent and 30 g of toluene were fed into a glass flask equipped with a stirrer, two dropping funnels, a gas-introducing tube and a thermometer. The contents in the flask were heated to 90° C.

From one of the two dropping funnels were dropped, in 3 hours, the remainder (two thirds) of the above mixture, 4.5 g of styrene and 2.1 g of mercaptopropionic acid. Simultaneously therewith, 0.3 g of azobisisobutyronitrile dissolved in 35.0 g of toluene was dropped from the other dropping funnel in 3 hours.

Then, 0.3 g of azobisisobutyronitrile dissolved in 35.0 g of toluene was dropped in 2 hours. The resulting mixture was subjected to a further reaction of hours to obtain a solution of a polymer having a carboxyl group at one end.

To the solution of a polymer having a carboxyl group at one end were added 0.04 g of methoxybenzoquinone, 2.7 g of tetrabutylammonium bromide and 2.2 g of glycidyl methacrylate. The mixture was subjected to a reaction at 90° C. for 5 hours with air being blown thereinto, to obtain a macromolecular monomer M-1 having a methacryloyl group at one end at a purity of 99.7% as calculated from the decrease of the acid value of the polymer. The macromolecular monomer M-1 had a polystyrene-reduced number-average molecular weight of 3,300 as measured by gel permeation chromatography. In the macromolecular monomer M-1, the monomer composition of the polymer skeleton was cyclohexyl methacrylate/2-ethylhexyl methacrylate/hydroxyethyl methacrylate/styrene =4.9/55/25.1/15 (by weight %).

REFERENTIAL EXAMPLE 2

(Synthesis of macromolecular monomer M-2)

The procedure of Referential Example 1 was repeated except that the total amount of mercaptopropionic acid (chain transfer agent) used was changed to 0.79 g, to obtain a macromolecular monomer M-2 having a methacryloyl group at one end at a purity of 99.6%, having a number-average molecular weight of 6,000.

REFERENTIAL EXAMPLE 3

(Synthesis of aqueous graft copolymer A)

The following monomers and 13.5 g of styrene were copolymerized. Incidentally, the following monomers were mixed and used as a mixture.

| | |
|---|---|
| AN-6 [macromolecular monomer of poly(acrylonitrile/styrene) type] | 10 g |
| n-Butyl methacrylate (hereinafter referred to as nBMA) | 11.6 g |
| n-Butyl acrylate (hereinafter referred to as nBA) | 46.8 g |
| Acrylic acid (hereinafter referred to as AA) | 5.2 g |
| 2-Hydroxyethyl methacrylate (hereinafter referred to as HEMA) | 12.9 g |

That is, one third of the mixture of the above monomers, 9.5 g of styrene, 0.18 g of mercaptoethanol, 6.3 g of ethylene glycol monobutyl ether and 14.7 g of isopropyl alcohol were fed into a glass flask equipped with a stirrer, a reflux condenser, two dropping funnels, a gas-introducing tube and a thermometer. The contents in the flask were heated to 87° C.

From one of the two dropping funnels was dropped, in 3 hours, a mixture of the remainder (two thirds) of the monomer mixture, 4.0 g of styrene and 0.27 g of mercaptoethanol. Simultaneously therewith, a polymerization initiator solution consisting of 19.2 g of ethylene glycol monobutyl ether, 44.8 g of isopropyl alcohol and 0.2 g of 2,2'-azobis(2-methylbutyronitrile) (hereinafter referred to as ABN-E) was dropped from the other dropping funnel in 3 hours.

Then, 4.5 g of ethylene glycol monobutyl ether, 10.5 g of isopropyl alcohol and 0.46 g of ABN-E were dropped in 2 hours. Thereafter, stirring was conducted for 2 hours to synthesize a carboxyl group-containing copolymer. The copolymer had a polystyrene-reduced number-average molecular weight of 8,000 as measured by gel permeation chromatography.

The above-obtained solution of a carboxyl group-containing copolymer was heated to 40° C. and subjected to distillation under reduced pressure to remove isopropyl alcohol. The resulting material was mixed with 6.4 g of dimethylethanolamine (hereinafter referred to as DMEA) and 70 g of distilled water to conduct neutralization.

By the above procedure was obtained a semitransparent viscous aqueous solution of a graft copolymer A, having a solid content of 50% by weight and containing 15% by weight of ethylene glycol monobutyl ether.

REFERENTIAL EXAMPLES 4–6

(Synthesis of aqueous graft copolymers B, C and D)

The components shown in Table 1 were polymerized in the same manner as in Referential Example 3, followed by neutralization with DMEA, to obtain aqueous solutions of graft copolymers B, C and D.

TABLE 1

|  |  | Aqueous copolymer | | | |
|---|---|---|---|---|---|
|  |  | A | B | C | D |
| AN-6 | (g) | 10.0 | 20.0 | — | — |
| AA-6 | (g) | — | — | 10.0 | — |
| nBMA | (g) | 11.6 | 1.7 | — | 12.8 |
| MMA | (g) | — | — | 13.2 | — |
| St | (g) | 13.5 | 12.0 | 13.2 | 15.0 |
| EA | (g) | — | — | 5.4 | — |
| nBA | (g) | 46.8 | 49.6 | 40.5 | 52.0 |
| AA | (g) | 5.2 | 5.2 | 5.2 | 5.8 |
| HEMA | (g) | 12.9 | 11.5 | 12.5 | 14.4 |
| (Total of above) | (g) | (100) | (100) | (100) | (100) |
| DMEA | (g) | 6.4 | 6.5 | 6.4 | 7.2 |

Note:
MMA refers to methyl methacrylate; St refers to styrene; and EA refers to ethyl acrylate.

EXAMPLES 1–3

Each of the aqueous graft copolymer solutions obtained in Referential Examples 3–6 was mixed with 40 parts by weight, per 100 parts by weight of the solid content of the copolymer, of an amino resin [Cymel 1123 (benzoguanamine resin) produced by Mitsui Cyanamid Ltd. or Cymel 303 (hexamethoxymethylolmelamine) produced by Mitsui Cyanamid Ltd.] in a combination shown in Table 2, to obtain aqueous coating compositions.

In Table 2, the curing agent H1 refers to Cymel 1123 and the curing agent H2 refers to Cymel 303. The same applies also to Table 4 which appears later.

To each of the aqueous coating compositions were added a silicone type levelling agent, ethylene glycol monobutyl ether and water so as to have an organic solvent content of 15% by weight and a solid content of 30% by weight. Each of the resulting coating compositions was coated on an aluminum plate using a bar coater, in a film thickness of 5–6 μm. The formed coating film was cured at 200° C. for 10 minutes.

Each of the cured coating films obtained above and the coating films after having been subjected to a pressurized steam treatment (30 minutes standing in steam of 130° C.) using a pressure cooker apparatus, was measured for various properties. The results are shown in Table 2.

COMPARATIVE EXAMPLES 1–3

Aqueous coating compositions were produced in the same manner as in Example 1, using aqueous graft copolymers and amino resins shown in Table 2. Coating films were formed with the aqueous coating compositions and measured for properties. The results are shown in Table 2.

The comparison of Examples 1–3 with Comparative Examples 1–3 indicate that the cured coating films formed using the aqueous copolymers C or D showed very poor properties after having been subjected to the pressurized steam treatment.

TABLE 2

|  | Example | | | Comparative Example | | |
|---|---|---|---|---|---|---|
|  | 1 | 2 | 3 | 1 | 2 | 3 |
| Aqueous copolymer | A | A | B | C | D | D |
| Curing agent | H1 | H2 | H1 | H2 | H1 | H2 |
| Varnish appearance | Transparent | Transparent | Transparent | Transparent | Transparent | Transparent |
| Results (before treatment with pressurized steam) | | | | | | |
| Impact resistance (cm) | 45 | 40 | 35 | 30 | 30 | 20 |
| Water resistance | Pass | Pass | Pass | Pass | Pass | Partially whitened |
| Adhesivity (%) | 100 | 100 | 100 | 100 | 100 | 100 |
| Hardness | F | H | H | H | HB | F |
| Results (after treatment with pressurized steam) | | | | | | |
| Impact resistance (cm) | 35 | 15 | 30 | 10 | 5 | 0 |
| Adhesivity (%) | 100 | 100 | 100 | 100 | 100 | 100 |
| Hardness | F | F | H | F | HB | F |

In Table 2, the properties of coating film were all measured in accordance with the test methods specified by JIS K 5400.

Impact resistance

Measured by a DuPont type impact test (point of impact =½ in.; load =500 g).

Water resistance

Measured by a boiling water resistance test (time for sample dipping = 60 minutes).

Adhesivity

Measured by a tape cross-cutting test (evaluation was made based on the degree of remaining coating film after peeling of tape).

Hardness

Measured by a pencil scratching test.

REFERENTIAL EXAMPLES 7–9

(Synthesis of aqueous graft copolymers E, F and G)

Aqueous graft copolymers E, F and G having the monomer compositions shown in Table 3 were produced using the macromolecular monomer M-1 or M-2 having a HEMA monomer unit.

TABLE 3

|  |  | Aqueous copolymer | | |
|---|---|---|---|---|
|  |  | E | F | G |
| M-1 | (g) | 10.0 | — | — |
| M-2 | (g) | — | 10.0 | 10.0 |
| nBMA | (g) | — | — | 11.8 |
| MMA | (g) | 1.8 | 1.8 | — |
| St | (g) | 11.0 | 11.0 | 11.0 |
| EA | (g) | 21.0 | 21.0 | — |
| nBA | (g) | 38.0 | 38.0 | 49.0 |
| AA | (g) | 5.2 | 5.2 | 5.2 |
| HEMA | (g) | 13.0 | 13.0 | 13.0 |
| (total of above) | (g) | (100) | (100) | (100) |
| DMEA | (g) | 6.4 | 6.4 | 6.4 |

EXAMPLES 4–8

Using the aqueous graft copolymers E, F and G obtained in Referential Examples 7–9, coating films were formed in the same manner as in Examples 1–3. The coating films were measured for properties. The results are shown in Table 4.

TABLE 4

|  | Example | | | | |
|---|---|---|---|---|---|
|  | 4 | 5 | 6 | 7 | 8 |
| Aqueous copolymer | E | E | F | G | G |
| Curing agent | H1 | H2 | H1 | H1 | H2 |
| Varnish appearance | Transparent | Transparent | Transparent | Transparent | Transparent |
| Results (before treatment with pressurized steam) | | | | | |
| Impact resistance (cm) | 45 | 40 | 45 | 45 | 40 |
| Water resistance | Pass | Pass | Pass | Pass | Pass |
| Adhesivity (%) | 100 | 100 | 100 | 100 | 100 |
| Hardness | F | H | F | F | H |
| Results (after treatment with pressurized steam) | | | | | |
| Impact resistance (cm) | 35 | 15 | 30 | 35 | 15 |
| Adhesivity (%) | 100 | 100 | 100 | 100 | 100 |
| Hardness | F | F | F | H | F |

REFERENTIAL EXAMPLES 10–14

(Synthesis of aqueous graft copolymers H to L)

Aqueous graft copolymers H to L were synthesized in the same manner as in Referential Example 3, using the monomers shown in Table 5.

TABLE 5

|  |  | Aqueous copolymer | | | | |
|---|---|---|---|---|---|---|
|  |  | H | I | J | K | L |
| Placcel FM5 | (g) | 20.0 | 10.0 | — | — | — |
| Placcel FM3 | (g) | — | — | 20.0 | — | — |
| Placcel FM8 | (g) | — | — | — | 20.0 | — |
| EHMA | (g) | 48.3 | — | — | — | — |
| iBMA | (g) | — | 20.5 | 17.9 | 26.7 | 12.5 |
| St | (g) | 14.4 | 22.4 | 20.0 | 20.0 | 15.0 |
| nBA | (g) | — | 27.9 | 24.8 | 16.0 | 52.5 |
| AA | (g) | 5.8 | 5.8 | 5.8 | 5.8 | 5.8 |
| HEMA | (g) | 11.5 | 13.4 | 11.5 | 11.5 | 14.4 |
| (Total of above) | (g) | (100) | (100) | (100) | (100) | (100) |
| DMEA | (g) | 6.4 | 6.4 | 7.2 | 7.2 | 7.2 |

Note:
EHMA and iBMA refer to 2-ethylhexyl methacrylate and isobutyl methacrylate, respectively.

EXAMPLES 9–12 AND COMPARATIVE EXAMPLE 4

Using the aqueous graft copolymers H to L obtained in Referential Examples 10–14 and Cymel 1123, coating films were formed in the same manner as in Examples 1–3. The coating films were measured for properties. The results are shown in Table 6.

TABLE 6

|  | Example | | | | Comparative |
|---|---|---|---|---|---|
|  | 9 | 10 | 11 | 12 | Example 4 |
| Aqueous copolymer | H | I | J | K | L |
| Varnish appearance | Transparent | Transparent | Transparent | Transparent | Transparent |
| Results (before treatment with pressurized steam) | | | | | |
| Impact resistance (cm) | 45 | 40 | 40 | 45 | 30 |
| Water resistance | Pass | Pass | Pass | Pass | Pass |
| Adhesivity (%) | 100 | 100 | 100 | 100 | 100 |
| Hardness | F | H | H | F | HB |
| Results (after treatment with pressurized steam) | | | | | |
| Impact resistance (cm) | 40 | 35 | 35 | 40 | 5 |
| Adhesivity (%) | 100 | 100 | 100 | 100 | 100 |
| Hardness | H | H | F | F | HB |

We claim:

1. An aqueous coating composition comprising an aqueous graft copolymer and an amino resin, said aqueous graft copolymer being obtained by neutralizing, with a base, the carboxyl groups of a copolymer which is obtained by copolymerizing the following components (a), (b), (c) and (d) and which comprises a unit derived from the component (a), a unit derived from the component (b), a unit derived from the component (c) and a unit derived from the component (d) in amounts of 3–30% by weight, 3–20% by weight, 5–40% by weight and 10–89% by weight, respectively, all based on the total of said units derived from the components (a) to (d):

(a) a radical-polymerizable polyester which is a polyester of lower condensation degree having a (meth)acryloyl group at one end, (b) an α,β-ethylenically unsaturated carboxylic acid, (c) a hydroxyalkyl (meth)acrylate, and (d) another vinyl monomer.

2. A composition according to claim 1, wherein the radical-polymerizable polyester is represented by the following chemical formula (1) or (2) and has a number-average molecular weight of 400–4,000:

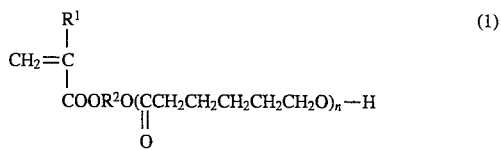

wherein $R^1$ is hydrogen atom or methyl group, $R^2$ is an alkylene group of 2–4 carbon atoms, and n is 2–10, or

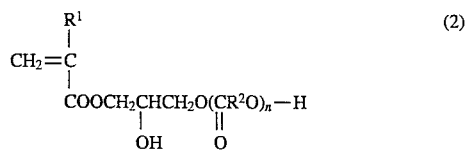

wherein $R^1$ is hydrogen atom or methyl group, $R^2$ is an alkylene group of 17 carbon atoms, and n is 2–10.

3. A composition according to claim 1, wherein the α,β-ethylenically unsaturated carboxylic acid as the component (b) is selected from the group consisting of acrylic acid, methacrylic acid, crotonic acid, maleic acid, maleic anhydride, fumaric acid and itaconic acid.

4. A composition according to claim 1, wherein the hydroxyalkyl (meth)acrylate as the component (c) is selected from the group consisting of hydroxyethyl (meth)acrylate, 2-hydroxypropyl (meth)acrylate, 3-hydroxypropyl (meth)acrylate and hydroxybutyl (meth)acrylate.

5. A composition according to claim 1, wherein the other vinyl monomer as the component (d) is selected from the group consisting of (meth)acrylic acid esters, styrene derivatives, (meth)acrylonitrile, (meth)acrylamide, N-methoxymethyl(meth)acrylamide, N-butoxymethyl(meth)acrylamide and alkylamino esters of (meth)acrylic acid.

6. A composition according to claim 5, wherein the other vinyl monomer as the component (d) is a monomer having a hydroxyl group—reactive functional group, consisting of N-methoxymethyl(meth)acrylamide or N-(n-butoxy)methyl(meth)acrylamide or a mixture thereof, which is contained in the copolymer in an amount of 30% by weight or less.

7. A composition according to claim 1, wherein the copolymer composed of the components (a) to (d) has a hydroxyl value of 20–150 KOH mg/g and a number-average molecular weight of 2,000–20,000.

8. A composition according to claim 1, wherein the base is selected from the group consisting of monoethanolamine, dimethylamine, diethylamine, triethylamine, triethanolamine, diethylethanolamine, dimethylethanolamine and ammonia.

9. A composition according to claim 1, wherein the amino resin is selected from the group consisting of alkyl-etherified melamine resins, alkyl-etherified urea resins and alkyl-etherified benzoguanamine resins.

10. A composition according to claim 1, wherein the amino resin is used in an amount of 10–80 parts by weight per 100 parts by weight, in terms of solid content, of the aqueous graft copolymer.

11. A process for coating a metal substrate, which comprises coating the metal substrate with an aqueous coating composition according to claim 1.

12. A metal can whose outer surface is coated with an aqueous coating composition according to claim 1.

13. An aqueous coating composition according to claim 1 wherein said copolymer comprises 15–35% by weight of said hydroxyalkyl (meth)acrylate based on the total constitutional monomer units of said copolymer.

14. A composition according to claim 1 wherein said unit derived from component (a) comprises 5–20% by weight, said unit derived from component (c) comprises 5–30% by weight, and said unit derived from component (d) comprises 60–70% by weight, all based on the weight of said aqueous graft copolymer; said aqueous graft copolymer has a number-average molecular weight of 3,000–15,000; and the solids content of said aqueous graft copolymer in said aqueous coating composition is 20–70% by weight.

* * * * *